(12) United States Patent
Peng

(10) Patent No.: US 11,349,352 B2
(45) Date of Patent: May 31, 2022

(54) METHOD AND DEVICE FOR SUPPRESSING CHANGE OF WIRELESS POWER

(71) Applicant: Wistron NeWeb Corporation, Hsinchu (TW)

(72) Inventor: Chui-Sung Peng, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 17/333,105

(22) Filed: May 28, 2021

(65) Prior Publication Data
US 2021/0399592 A1 Dec. 23, 2021

(30) Foreign Application Priority Data

Jun. 17, 2020 (TW) .................................. 109120471

(51) Int. Cl.
| | |
|---|---|
| *H04B 17/13* | (2015.01) |
| *H04W 52/08* | (2009.01) |
| *H04W 52/22* | (2009.01) |
| *H04W 52/52* | (2009.01) |
| *H02J 50/80* | (2016.01) |

(Continued)

(52) U.S. Cl.
CPC .......... *H02J 50/80* (2016.02); *H02J 7/00712* (2020.01); *H04B 17/102* (2015.01); *H04B 17/13* (2015.01);

(Continued)

(58) Field of Classification Search
CPC ........ H02J 7/00712; H02J 50/20; H02J 50/80; H04B 17/10; H04B 17/101; H04B 17/102;

(Continued)

(56) References Cited

U.S. PATENT DOCUMENTS

| | | | | | |
|---|---|---|---|---|---|
| 5,835,846 | A | * | 11/1998 | Furukawa | ........... H04W 52/228 |
| | | | | | 455/67.11 |
| 6,118,988 | A | * | 9/2000 | Choi | ...................... H04W 52/52 |
| | | | | | 455/522 |

(Continued)

FOREIGN PATENT DOCUMENTS

| | | |
|---|---|---|
| CN | 1157964 C | 7/2004 |
| CN | 108599874 A | 9/2018 |
| EP | 0548939 B1 | 9/2000 |

*Primary Examiner* — Levi Gannon
(74) *Attorney, Agent, or Firm* — McClure, Qualey & Rodack, LLP (57) ABSTRACT

A method for suppressing a change of wireless power includes a parameter setting step, a first power verifying step, a power adjusting step and a second power verifying step. The parameter setting step is performed to set a power parameter set. The first power verifying step is performed to verify whether a first power difference is greater than the power adjustment start difference to generate a first verification result. The power adjusting step is performed to drive a processing unit to adjust the power amplifying unit according to the adjustment parameter set. The second power verifying step is performed to verify whether a second power difference is smaller than or equal to the power adjustment stop difference to generate a second verification result. The processing unit determines whether the power adjusting step is performed according to one of the first verification result and the second verification result.

20 Claims, 6 Drawing Sheets

(51) Int. Cl.
 *H02J 7/00* (2006.01)
 *H04B 17/10* (2015.01)

(52) U.S. Cl.
 CPC ......... *H04W 52/08* (2013.01); *H04W 52/226* (2013.01); *H04W 52/228* (2013.01); *H04W 52/52* (2013.01)

(58) Field of Classification Search
 CPC ............ H04B 17/104; H04B 17/11–13; H04B 17/15–19; H04W 52/04; H04W 52/06; H04W 52/08; H04W 52/18; H04W 52/20; H04W 52/22; H04W 52/221; H04W 52/225; H04W 52/226; H04W 52/228; H04W 52/30; H04W 52/44; H04W 52/52
 See application file for complete search history.

(56) References Cited

U.S. PATENT DOCUMENTS

| | | | |
|---|---|---|---|
| 6,519,293 B1* | 2/2003 | Miyake | H03G 3/3047 375/296 |
| 6,670,849 B1* | 12/2003 | Damgaard | H03G 3/3042 330/85 |
| 7,123,881 B2 | 10/2006 | Agin et al. | |
| 2004/0053633 A1* | 3/2004 | Ha | H04W 52/52 455/522 |
| 2007/0135071 A1* | 6/2007 | Lee | H04W 52/52 455/232.1 |
| 2020/0037263 A1* | 1/2020 | Langer | H04W 52/42 |
| 2021/0022188 A1* | 1/2021 | Yu | H04B 1/0483 |

* cited by examiner

METHOD AND DEVICE FOR SUPPRESSING CHANGE OF WIRELESS POWER

RELATED APPLICATIONS

This application claims priority to Taiwan Application Serial Number 109120471, filed Jun. 17, 2020, which is herein incorporated by reference.

BACKGROUND

Technical Field

The present disclosure relates to a method and a device for suppressing a change of power. More particularly, the present disclosure relates to a method and a device for suppressing a change of wireless power.

Description of Related Art

Radio wave can be applied in wireless sensing such as object moving detection, breathing detection or falling detection. For example, the monitor can use a standard Wi-Fi device to notice the aforementioned detection by analyzing a change of a channel state information (CSI). Therefore, this technology can be applied in service of security or home care. When a moving event occurred, a change of the directing shooting path and the reflecting path of the radio wave in the space will be influenced, so the monitor can analyze a change of the amplitude and the phase of the radio wave on each packet from the CSI, and notice the occurred of the event. However, the emitting of the radio wave can be affected by other factors, such as voltage, temperature or clock. The change of those factors may also generate a change of the CSI, hence judging the occurred of the event by the change of the CSI may be misjudged easily, and the false alarm may increase.

In terms of the hardware, when the system is affected by the external environment, the output power can be controlled by a close loop power control (CLPC) to maintain the accurate output power. In the convergence process of the CLPC, the bigger the adjustment of the unit time, the bigger the change of the CSI, so the moving detection may be misjudged easily. Therefore, there is an urgent need for a solution of a method and a device for suppressing a change of wireless power which is featured with low alarm rate in today's market.

SUMMARY

According to one aspect of the present disclosure, a method for suppressing a change of wireless power is performed. The method for suppressing the change of wireless power includes performing a parameter setting step, a first power detecting step, a power adjustment starting step, a power adjusting step, a second power detecting step and a power adjustment stopping step. The parameter setting step is performed to set a power parameter set and store the power parameter set to a memory. The power parameter set includes a power adjustment start difference, a power adjustment stop difference, a target output power and an adjustment parameter set. The first power detecting step is performed to drive a power detector to detect an output power of a power amplifying unit to obtain a first output power. The power adjustment starting step is performed to drive a processing unit to calculate a first power difference between the first output power and the target output power, and verify whether the first power difference is greater than the power adjustment start difference to generate a first verification result. The power adjusting step is performed to drive the processing unit to adjust the power amplifying unit according to the adjustment parameter set to change the output power of the power amplifying unit. The second power detecting step is performed to drive the power detector to detect the output power of the power amplifying unit to obtain a second output power. The power adjustment stopping step is performed to drive the processing unit to calculate a second power difference between the second output power and the target output power, and verify whether the second power difference is smaller than or equal to the power adjustment stop difference to generate a second verification result. The processing unit determines whether the power adjusting step is performed according to at least one of the first verification result and the second verification result.

According to another aspect of the present disclosure, a method for suppressing a change of wireless power is performed. The method for suppressing the change of wireless power includes a parameter setting step, a first power verifying step, a power adjusting step and a second power verifying step. The parameter setting step is performed to set a power parameter set, and store the power parameter set to a memory. The power parameter set includes a power adjustment start difference, a power adjustment stop difference, a target output power and an adjustment parameter set. The first power verifying step is performed to verify whether a first power difference between a first output power of a power amplifying unit and the target output power is greater than the power adjustment start difference to generate a first verification result. The power adjusting step is performed to drive a processing unit to adjust the power amplifying unit according to the adjustment parameter set. The second power verifying step is performed to verify whether a second power difference between a second output power of the power amplifying unit and the target output power is smaller than or equal to the power adjustment stop difference to generate a second verification result. The processing unit determines whether the power adjusting step is performed according to at least one of the first verification result and the second verification result, and the parameter setting step, the first power verifying step, the power adjusting step and the second power verifying step are carried out in sequence.

According to further another aspect of the present disclosure, a device for suppressing a change of wireless power includes a memory, a power amplifying unit, a power detector and a processing unit. The memory stores a power parameter set, the power parameter set includes a power adjustment start difference, a power adjustment stop difference, a target output power and an adjustment parameter set. The power amplifying unit generates an output power. The power detector is electrically connected to the power amplifying unit, the power detector detects the output power of the power amplifying unit to obtain a first output power and a second output power. The processing unit is electrically connected to the memory, the power amplifying unit and the power detector The processing unit verifies whether a first power difference between the first output power of the power amplifying unit and the target output power is greater than the power adjustment start difference to generate a first verification result, and the processing unit verifies whether a second power difference between a second output power and the target output power is smaller than or equal to the power adjustment stop difference to generate a second verification result, the processing unit determines whether the power amplifying unit is adjusted according to at least one of the first verification result and the second verification result. The processing unit adjusts the power amplifying unit according to the adjustment parameter set.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
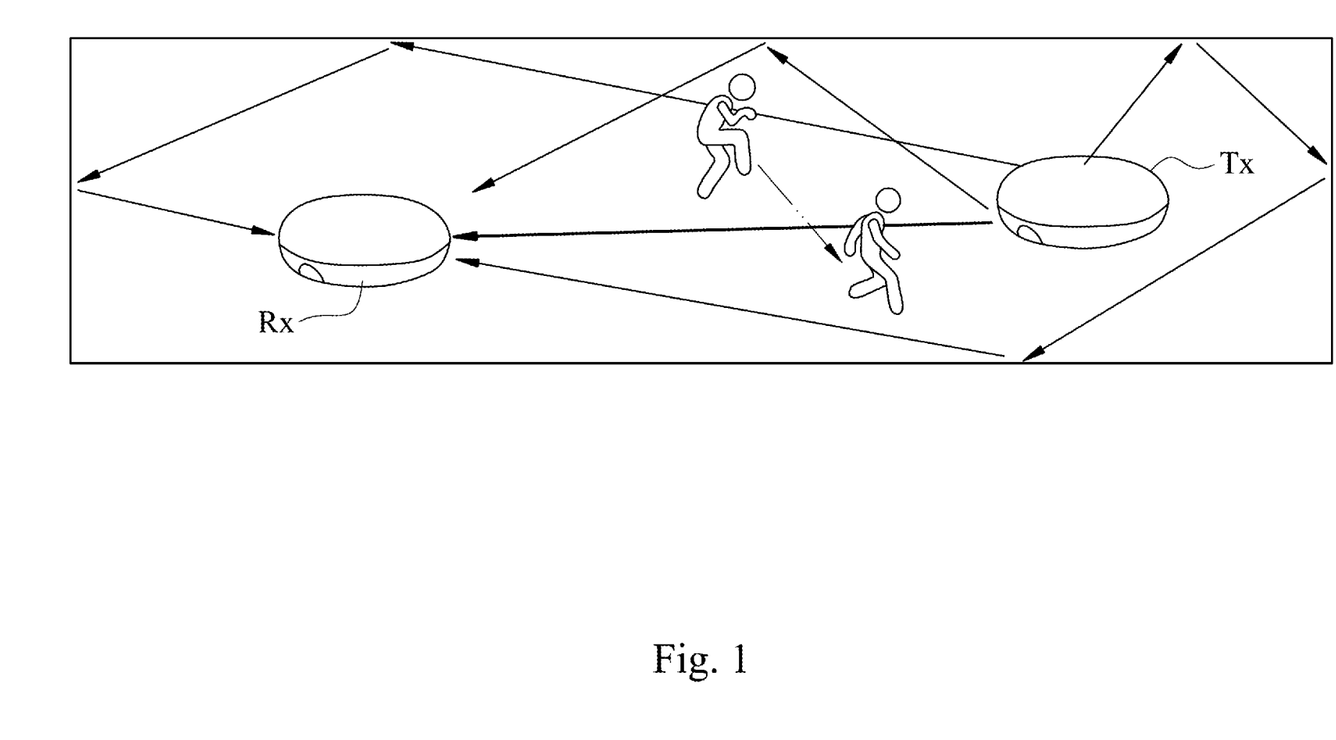
FIG. 1 is a schematic view of a moving object affecting a radio wave transferring in a space.
Figure 2:
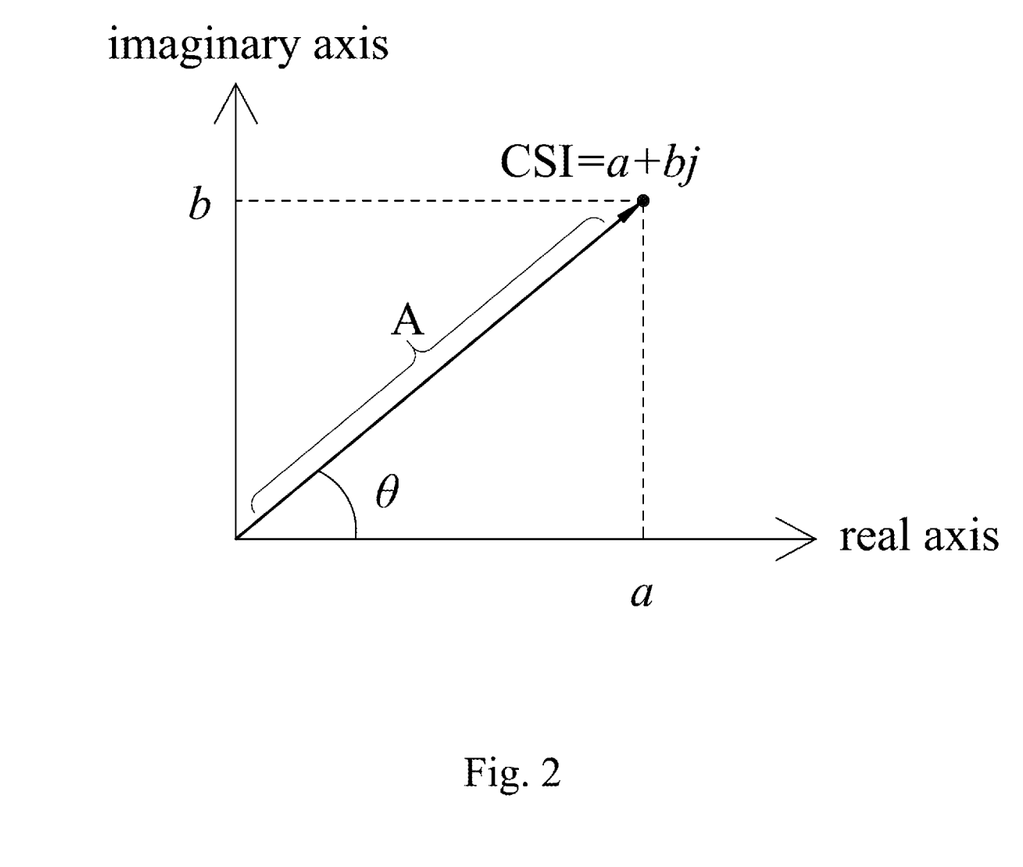
FIG. 2 is a schematic view of a channel state information in a complex coordinate plane.

FIG. 1 is a schematic view of a moving object affecting a radio wave transferring in a space. FIG. 2 is a schematic view of a channel state information (CSI) in a complex coordinate plane. The CSI can represent how a wireless signal is passed through multiple paths from a transmitter Tx to a receiver Rx in a certain carrier frequency. In terms of a Wi-Fi system with multiple-input multiple-output orthogonal frequency-division multiplexing (MIMO-OFDM), the CSI is a three-dimensional array with complex values and represents an attenuation of an amplitude A and a shift of a phase θ of the multiple paths in the Wi-Fi channel, the CSI can be represented as a complex value, i.e., CSI=a+bj, where a and b represent a real part and an imaginary part, respectively, as shown in FIG. 2. Thus, the Wi-Fi system can utilize the aforementioned characteristic to apply in the detection of moving object (such as human). When an object moves in a specific space, a change of a directing shooting path and a reflecting path of the radio wave in the specific space will be influenced, and the CSI will also change. Thus, the CSI can analyze an event with an object moving. Besides the change of the CSI by the moving of the object, the change of the CSI also be caused by a change of the radio wave, such as a change of the transmitting power, a shift of a phase of the system. Therefore, a method for suppressing those changes of the CSI is proposed to avoid the misjudging of the detection of the moving object.

Figure 3:
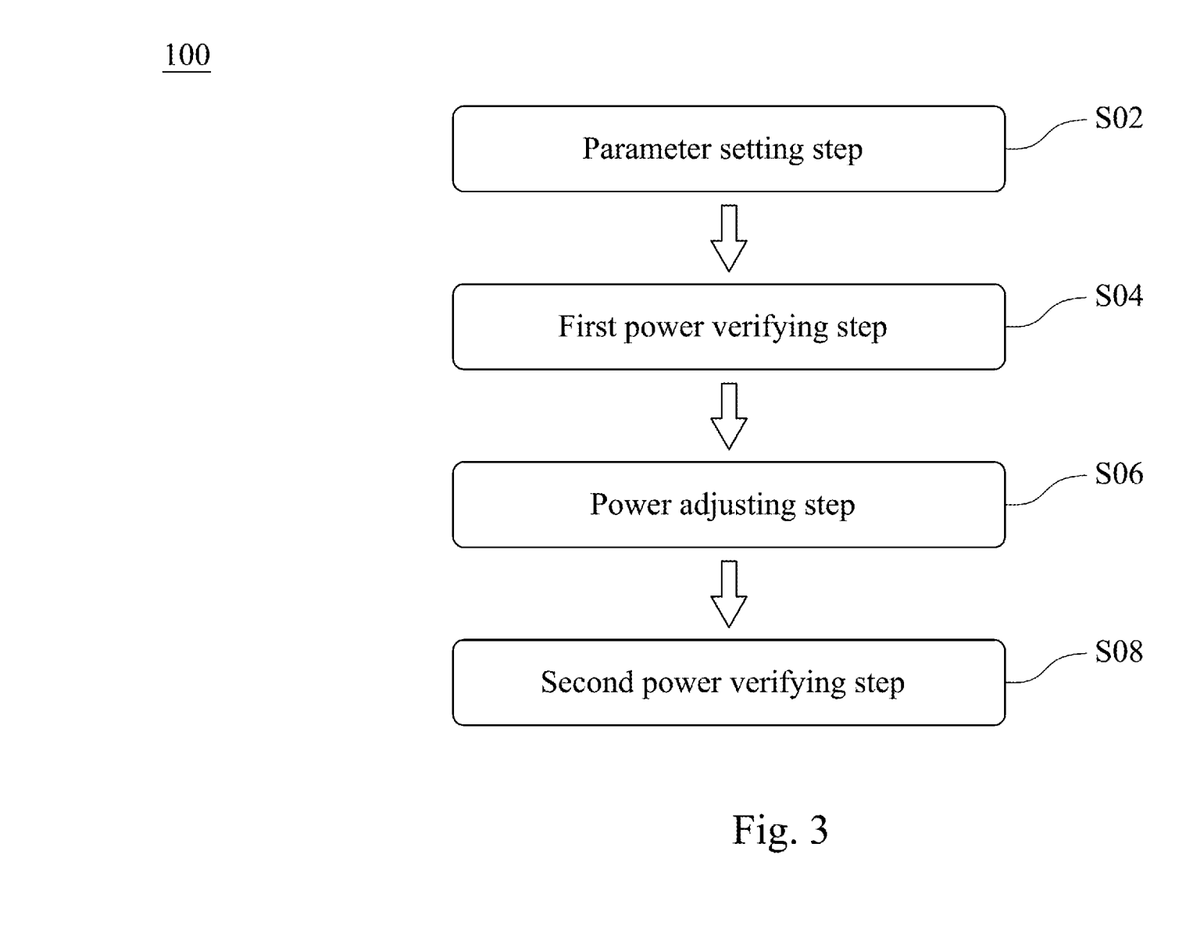
FIG. 3 is a flow chart of a method for suppressing a change of wireless power according to a first embodiment of the present disclosure.

FIG. 3 is a flow chart of a method 100 for suppressing the change of wireless power according to a first embodiment of the present disclosure. The method 100 for suppressing the change of wireless power includes a parameter setting step S02, a first power verifying step S04, a power adjusting step S06 and a second power verifying step S08.

The parameter setting step S02 is performed to set a power parameter set, and store the power parameter set to a memory. The power parameter set includes a power adjustment start difference, a power adjustment stop difference, a target output power and an adjustment parameter set.

The first power verifying step S04 is performed to verify whether a first power difference between a first output power of a power amplifying unit and the target output power is greater than the power adjustment start difference to generate a first verification result.

The power adjusting step S06 is performed to drive a processing unit to adjust the power amplifying unit according to the adjustment parameter set.

The second power verifying step S08 is performed to verify whether a second power difference between a second output power of the power amplifying unit and the target output power is smaller than or equal to the power adjustment stop difference to generate a second verification result.

The processing unit determines whether the power adjusting step S06 is performed according to at least one of the first verification result of the first power verifying step S04 and the second verification result of the second power verifying step S08. Thus, the method 100 for suppressing the change of wireless power of the present disclosure utilizes the limitation of the adjustment parameter set to suppress a change of the output power and the change of the CSI to avoid the misjudging of the detection of the moving object. The steps will be described in more detail below by the embodiments of each of the steps.

Figure 4:
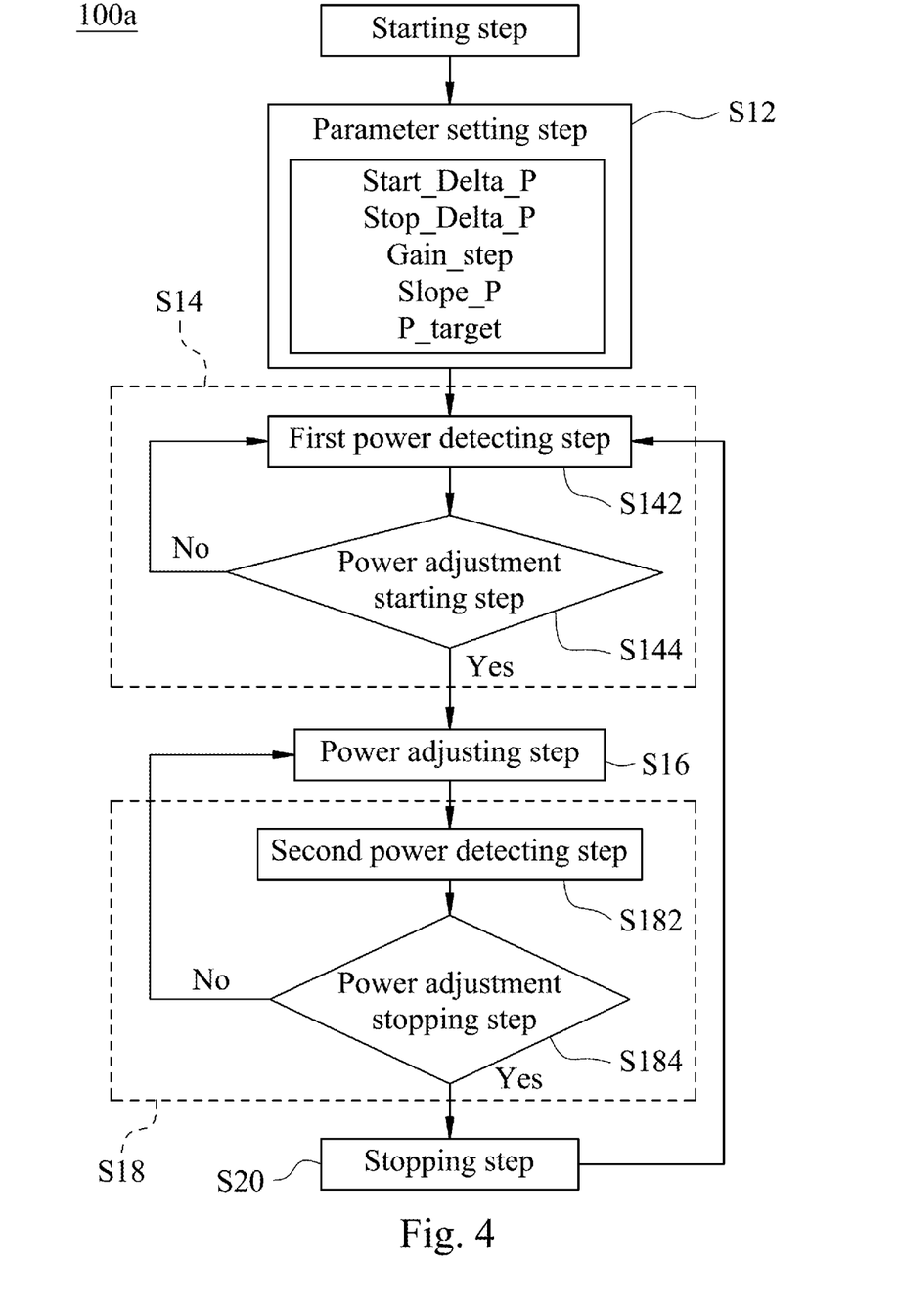
FIG. 4 is a flow chart of a method for suppressing a change of wireless power according to a second embodiment of the present disclosure.
Figure 5:
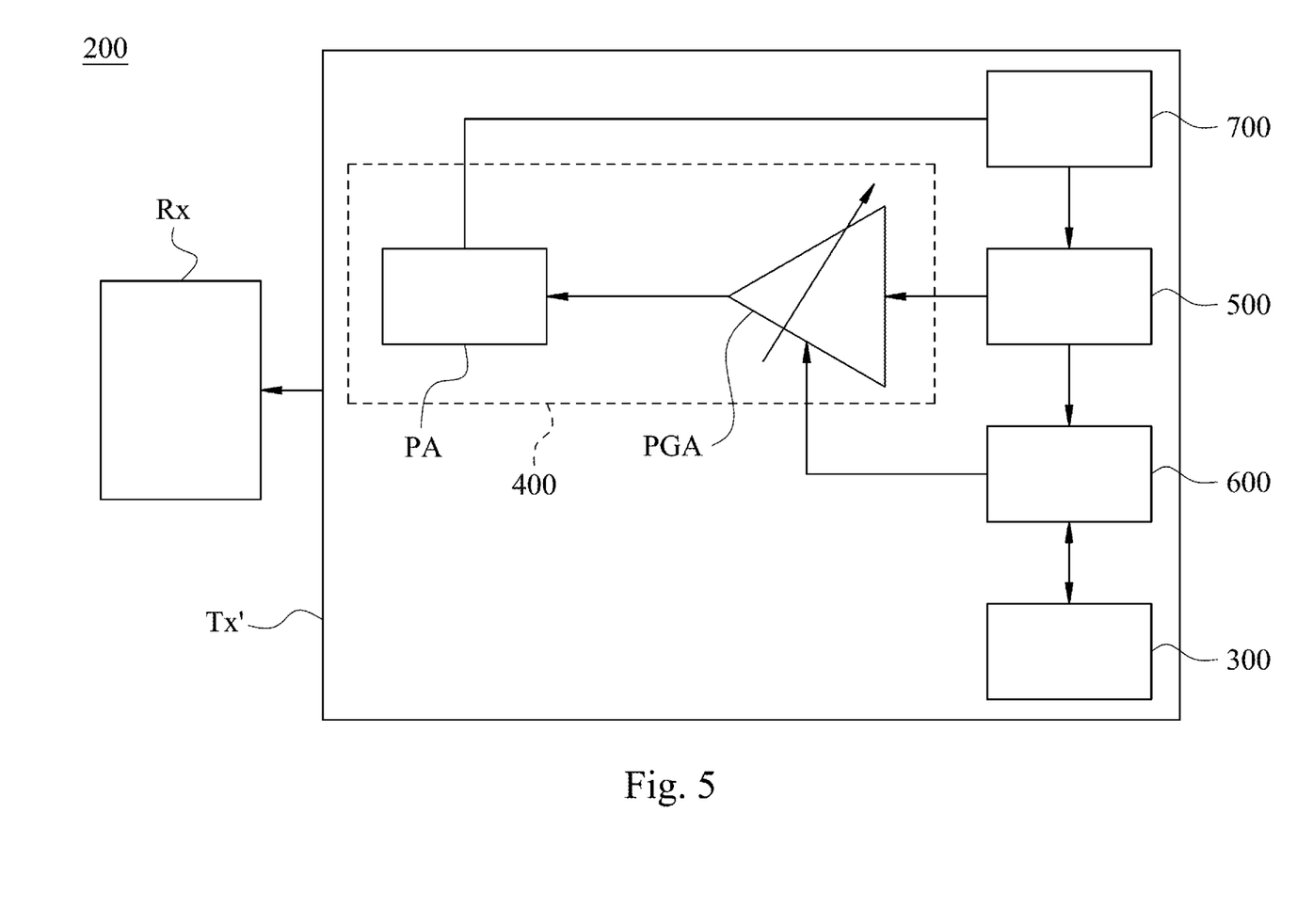
FIG. 5 is a block diagram of a device for suppressing a change of wireless power according to a third embodiment of the present disclosure.

FIG. 4 is a flow chart of a method 100a for suppressing a change of wireless power according to a second embodiment of the present disclosure. FIG. 5 is a block diagram of a device 200 for suppressing a change of wireless power according to a third embodiment of the present disclosure. In FIGS. 3-5, the method 100a for suppressing the change of wireless power includes a parameter setting step S12, a first power verifying step S14, a power adjusting step S16, a second power verifying step S18 and a stopping step S20.

The parameter setting step S12 is performed to seta power parameter set and store the power parameter set to a memory 300. The power parameter set includes a power adjustment start difference Start_Delta_P, a power adjustment stop difference Stop_Delta_P, a target output power P_target and an adjustment parameter set. In detail, the adjustment parameter set includes any two of a power adjusting amplitude Gain_step (the unit is dB/step), a power adjusting time-varying value Slope_P (the unit is dB/sec) and a power adjusting period value Period_step (the unit is sec/step). The power adjusting amplitude Gain_step represents a change of an output power of the power adjusting step S16. The power adjusting time-varying value Slope_P represents the change of the output power in an unit time period, and the power adjusting period value Period_step represents an executing time of the power adjusting step S16. The power adjustment start difference Start_Delta_P is greater than the power adjustment stop difference Stop_Delta_P. The power adjusting amplitude Gain_step is smaller than or equal to a predetermined amplitude, and the predetermined amplitude is between 0.01 dB and 0.1 dB during the power adjusting step S16. In other words, the predetermined amplitude is between 0.01 dB/step and 0.1 dB/step, and "step" represents the power adjusting step S16, i.e., a process of executing the power adjusting step S16 one time. The power adjusting time-varying value Slope_P is smaller than or equal to a predetermined time-varying value, and the predetermined time-varying value is between 0.01 dB/sec and 0.2 dB/sec. The aforementioned predetermined amplitude and the predetermined time-varying value can be determined according to the demand of the system, but the present disclosure is not limited thereto. The power adjusting period value Period_step is equal to the power adjusting amplitude Gain_step divided by the power adjusting time-varying value Slope_P.

The first power verifying step S14 includes a first power detecting step S142 and a power adjustment starting step S144. The first power detecting step S142 is performed to drive a power detector 500 to detect an output power of the power amplifying unit 400 to obtain the first output power P1_measure. The power adjustment starting step S144 is performed to drive the processing unit 600 to calculate the first power difference between the first output power P1_measure and the target output power P_target, and verify whether the first power difference is greater than the power adjustment start difference Start_Delta_P to generate the first verification result. If the first verification result is the first power difference greater than the power adjustment start difference Start_Delta_P, the power adjusting step S16 is performed. If the first verification result is the first power difference smaller than or equal to the power adjustment start difference Start_Delta_P, the first power detecting step S142 is performed again.

The power adjusting step S16 is performed to drive the processing unit 600 to adjust the power amplifying unit 400 according to the adjustment parameter set to change the output power of the power amplifying unit 400.

The second power detecting step S18 includes a second power detecting step S182 and a power adjustment stopping step S184. The second power detecting step S182 is performed to drive the power detector 500 to detect the output power of the power amplifying unit 400 to obtain a second output power P2_measure. The power adjustment stopping step S184 is performed to drive the processing unit 600 to calculate the second power difference between the second output power P2_measure and the target output power P_target, and verify whether the second power difference is smaller than or equal to the power adjustment stop difference Stop_Delta_P to generate a second verification result. If the second verification result is the second power difference greater than the power adjustment stop difference Stop_Delta_P, the power adjusting step S16 is performed again. If the second verification result is the second power difference smaller than or equal to the power adjustment stop difference Stop_Delta_P, a stopping step S20 is performed.

The stopping step S20 is performed to stop the loop of the first power verifying step S14, the power adjusting step S16 and the second power verifying step S18. The first power detecting step S142 of the next loop is re-performed after the stopping step S20 is performed.

The processing unit 600 determines whether the power adjusting step S16 is performed according to at least one of the first verification result of the power adjustment starting step S144 and the second verification result of the power adjustment stopping step S184. The parameter setting step S12, the first power verifying step S14, the power adjusting step S16, the second power verifying step S18 and the stopping step S20 are carried out in sequence. Thus, the method 100a for suppressing the change of wireless power utilizes the limitation of the adjustment parameter set and the specific sequence of the steps to fine-tune the output power, thereby not only reducing the change of the output power, but also avoiding the misjudging of the detection of the moving object.

Please refer to FIG. 1, FIG. 3, FIG. 4 and FIG. 5. In FIG. 5, the device 200 is configured to implement the methods 100, 100a for suppressing the change of wireless power, and includes a device Tx' for suppressing the change of the wireless power and a receiver Rx. The device Tx' for suppressing the change of the wireless power includes a memory 300, a power amplifying unit 400, a power detector 500, a processing unit 600 and a coupler 700. The receiver Rx is signally connected to the device Tx' for suppressing the change of wireless power in a wireless manner.

The memory 300 stores a power parameter set, the power parameter set includes a power adjustment start difference Start_Delta_P, a power adjustment stop difference Stop_Delta_P, a target output power P_target and an adjustment parameter set.

The power amplifying unit 400 generates an output power, and includes a power amplifier (PA) and a programmable gain amplifier (PGA). The PGA is electrically connected to the PA, the power detector 500 and the processing unit 600.

The power detector 500 is electrically connected to the power amplifying unit 400, and the power detector 500 detects the output power of the power amplifying unit 400 to obtain a first output power P1_measure and a second output power P2_measure.

The processing unit 600 is electrically connected to the memory 300, the power amplifying unit 400 and the power detector 500, and the processing unit 600 verifies whether a first power difference between the first output power P1_measure of the power amplifying unit 400 and the target output power P_target is greater than the power adjustment start difference Start_Delta_P to generate a first verification result, and the processing unit 600 verifies whether a second power difference between a second output power P2_measure and the target output power P_target is smaller than or equal to the power adjustment stop difference Stop_Delta_P to generate a second verification result. The processing unit 600 determines whether the power amplifying unit 400 is adjusted according to at least one of the first verification result and the second verification result. Moreover, the processing unit 600 can be a center processing unit (CPU), a microprocessor or other electric calculating processor, but not limited thereto. The processing unit 600 adjusts the power amplifying unit 400 according to the adjustment parameter set. The details related to the adjustment parameter set are described in the aforementioned parameter setting step S12, and will not be described herein again.

The coupler 700 is electrically connected between the power amplifying unit 400 and the power detector 500, that is, the coupler 700 is electrically connected to the PA of the power amplifying unit 400. The coupler 700 is configured to couple the output power of the power amplifying unit 400 to the power detector 500.

The aforementioned memory 300, the power amplifying unit 400, the power detector 500, the processing unit 600 and the coupler 700 form the CLPC. Thus, the device Tx' for suppressing the change of wireless power utilizes the software of the processing unit 600 to combine with the CLPC and the limitation of the adjustment parameter set to reduce the change of the output power of the power amplifying unit 400 so as to suppress the change of the CSI and reduce the false alarm rate.

For example, the target output power P_target is 15 dBm. If the shift of the output power (i.e., the power adjustment start difference Start_Delta_P) is greater than 1 dB, the CLPC is performed. The amplitude of each adjustment (i.e., the power adjusting amplitude Gain_step) is 0.1 dB, and the speed of each adjustment (i.e., the power adjusting time-varying value Slope_P) is 0.2 dB/sec. If the shift of the adjusted output power (i.e., the power adjustment stop difference Stop_Delta_P) is smaller than or equal to 0.3 dB, stopping the adjustment and measuring the output power continuously. Table 1 lists parameters set by the aforementioned condition. When the first output power P1_measure of the power amplifying unit 400 is equal to 14-16 dBm (15+/−1 dBm), the CLPC does not adjust the output power; when the first output power P1_measure is equal to 13.9 dBm, the CLPC adjusts the output power by the amplitude of 0.1 dB/step and the speed of 0.2 dB/sec, to generates the second output power P2_measure. That is the same as increasing 0.1 dB per 0.5 sec (i.e., the power adjusting period value Period_step is 0.5 sec/step). Stopping to adjust the first output power P1_measure when the first output power P1_measure is increased from 13.9 dBm to at least 14.7 dBm, and then continuing to monitor whether the first output power P1_measure is over 14-16 dBm.

TABLE 1

| power parameter set | parameter value |
| --- | --- |
| Start_Delta_P | 1 dB |
| Stop_Delta_P | 0.3 dB |
| Gain_step | 0.1 dB/step |
| Slope_P | 0.2 dB/sec |
| Period_step | 0.5 sec/step |
| P_target | 15 dBm |

Figure 6:
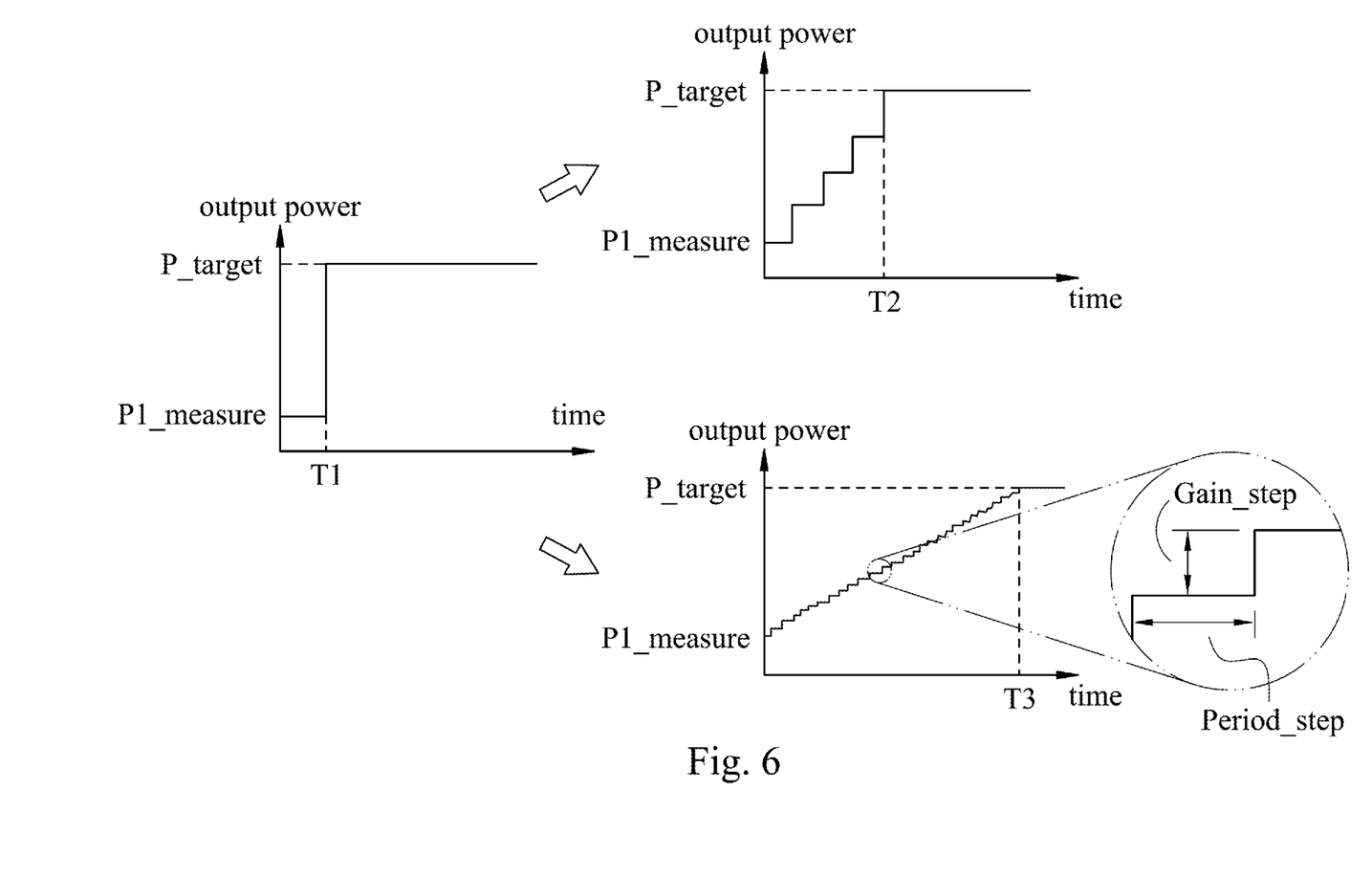
FIG. 6 is a schematic view of a change of an output power of a power amplifying unit of the present disclosure.

Please refer to FIG. 5 and FIG. 6. FIG. 6 is a schematic view of a change of an output power of the power amplifying unit 400. To suppress the change of the CSI, the present disclosure utilizes the limitation of the adjustment parameter set to reduce the change of the output power of the power amplifying unit 400. The adjustment parameter set includes any two of the power adjusting amplitude Gain_step, the power adjusting time-varying value Slope_P and the power adjusting period value Period_step. The limitation (e.g., smaller than or equal to a predetermined amplitude) of the power adjusting amplitude Gain_step represents increasing resolution of the power adjustment; the limitation (e.g., smaller than or equal to a predetermined time-varying value) of the power adjusting time-varying value Slope_P represents an upper limit of the power adjustment in a limit unit time; the limitation (e.g., greater than or equal to a predetermined period value) of the power adjusting period value Period_step represents a lower limit of the power adjusting time for each time. In FIG. 6, the power adjusting amplitude Gain_step of time T1 is the first output power P1_measure minus the target output power P_target. If the power adjusting amplitude Gain_step is too big, the CSI will be affected. The power adjusting amplitude Gain_step of time T2 is smaller than the power adjusting amplitude Gain_step of time T1, and the effect to the CS of time T2 is smaller. The power adjusting amplitude Gain_step of time T3 is smaller than the power adjusting amplitude Gain_step of time T2, and the effect to the CSI of time T3 is smaller than the effect of time T2.

According to the aforementioned embodiments and examples, the advantages of the present disclosure are described as follows.

1. The method for suppressing the change of wireless power utilizes the limitation of the adjustment parameter set and the specific sequence of the step to realize the fine-tune of the output power, not only reduce the change of the power, but also suppress the change of the CSI.

2. The device for suppressing the change of wireless power utilizes the software of the processing unit to combine with the CLPC and the limitation of the adjustment parameter set to reduce the change of the output power of the power amplifying unit to suppress the change of the CSI and reduce the false alarm rate.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for suppressing a change of wireless power, comprising:

performing a parameter setting step to set a power parameter set and store the power parameter set to a memory, wherein the power parameter set comprises a power adjustment start difference, a power adjustment stop difference, a target output power and an adjustment parameter set;

performing a first power detecting step to drive a power detector to detect an output power of a power amplifying unit to obtain a first output power;

performing a power adjustment starting step to drive a processing unit to calculate a first power difference between the first output power and the target output power, and verify whether the first power difference is greater than the power adjustment start difference to generate a first verification result;

performing a power adjusting step to drive the processing unit to adjust the power amplifying unit according to the adjustment parameter set to change the output power of the power amplifying unit;

performing a second power detecting step to drive the power detector to detect the output power of the power amplifying unit to obtain a second output power; and performing a power adjustment stopping step to drive the processing unit to calculate a second power difference between the second output power and the target output power, and verify whether the second power difference is smaller than or equal to the power adjustment stop difference to generate a second verification result;

wherein the processing unit determines whether the power adjusting step is performed according to at least one of the first verification result and the second verification result.

2. The method for suppressing the change of wireless power of claim 1, wherein the adjustment parameter set comprises any two of a power adjusting amplitude, a power adjusting time-varying value and a power adjusting period value, the power adjusting amplitude represents a change of the output power of the power adjusting step, the power adjusting time-varying value represents a change of the output power in an unit time period, and the power adjusting period value represents an executing time of the power adjusting step.

3. The method for suppressing the change of wireless power of claim 2, wherein,
the power adjustment start difference is greater than the power adjustment stop difference;
the power adjusting amplitude is smaller than or equal to a predetermined amplitude, and the predetermined amplitude is between 0.01 dB and 0.1 dB during the power adjusting step;
the power adjusting time-varying value is smaller than or equal to a predetermined time-varying value, and the predetermined time-varying value is between 0.01 dB/sec and 0.2 dB/sec; and
the power adjusting period value is equal to the power adjusting amplitude divided by the power adjusting time-varying value.

4. The method for suppressing the change of wireless power of claim 1, wherein in response to determining that the first verification result of the power adjustment starting step is the first power difference greater than the power adjustment start difference, the power adjusting step is performed.

5. The method for suppressing the change of wireless power of claim 4, wherein in response to determining that the first verification result of the power adjustment starting step is the first power difference smaller than or equal to the power adjustment start difference, the first power detecting step is performed.

6. The method for suppressing the change of wireless power of claim 1, wherein in response to determining that the second verification result of the power adjustment stopping step is the second power difference greater than the power adjustment stop difference, the power adjusting step is performed.

7. The method for suppressing the change of wireless power of claim 6, wherein in response to determining that the second verification result of the power adjustment stopping step is the second power difference smaller than or equal to the power adjustment stop difference, a stopping step is performed, and the first power detecting step is performed after the stopping step is performed.

8. A method for suppressing a change of wireless power, comprising:
performing a parameter setting step to set a power parameter set, and store the power parameter set to a memory, wherein the power parameter set comprises a power adjustment start difference, a power adjustment stop difference, a target output power and an adjustment parameter set;
performing a first power verifying step to verify whether a first power difference between a first output power of a power amplifying unit and the target output power greater than the power adjustment start difference to generate a first verification result;
performing a power adjusting step to drive a processing unit to adjust the power amplifying unit according to the adjustment parameter set; and
performing a second power verifying step to verify whether a second power difference between a second output power of the power amplifying unit and the target output power smaller than or equal to the power adjustment stop difference to generate a second verification result;
wherein the processing unit determines whether the power adjusting step is performed according to at least one of the first verification result and the second verification result, and the parameter setting step, the first power verifying step, the power adjusting step and the second power verifying step are carried out in sequence.

9. The method for suppressing the change of wireless power of claim 8, wherein the first power verifying step comprises:
performing a first power detecting step to drive a power detector to detect an output power of the power amplifying unit to obtain the first output power; and
performing a power adjustment starting step to drive the processing unit to calculate the first power difference between the first output power and the target output power, and verify whether the first power difference is greater than the power adjustment start difference, to generate the first verification result.

10. The method for suppressing the change of wireless power of claim 9, wherein the second power verifying step comprises:
performing a second power detecting step to drive the power detector to detect the output power of the power amplifying unit to obtain the second output power; and
performing a power adjustment stopping step to drive the processing unit to calculate the second power difference between the second output power and the target output power, and verify whether the second power difference is smaller than or equal to the power adjustment stop difference, to generate the second verification result.

11. The method for suppressing the change of wireless power of claim 8, wherein the adjustment parameter set comprises any two of a power adjusting amplitude, a power adjusting time-varying value and a power adjusting period value, the power adjusting amplitude represents a change of the output value of the power adjusting step, the power adjusting time-varying value represents a change of the output power in an unit time period, and the power adjusting period value represents an executing time of the power adjusting step.

12. The method for suppressing the change of wireless power of claim 11, wherein,
the power adjustment start difference is greater than the power adjustment stop difference;
the power adjusting amplitude is smaller than or equal to a predetermined amplitude, and the predetermined amplitude is between 0.01 dB and 0.1 dB during the power adjusting step;
the power adjusting time-varying value is smaller than or equal to a predetermined time-varying value, and the predetermined time-varying value is between 0.01 dB/sec and 0.2 dB/sec; and
the power adjusting period value is equal to the power adjusting amplitude divided by the power adjusting time-varying value.

13. The method for suppressing the change of wireless power of claim 9, wherein in response to determining that the first verification result of the power adjustment starting step is the first power difference greater than or equal to the power adjustment start difference, the power adjusting step is performed.

14. The method for suppressing the change of wireless power of claim 13, wherein in response to determining that the first verification result of the power adjustment starting step is the first power difference smaller than or equal to the power adjustment start difference, the first power detecting step is performed.

15. The method for suppressing the change of wireless power of claim 10, wherein in response to determining that the second verification result of the power adjustment stopping step is the second power difference greater than the power adjustment stop difference, the power adjusting step is performed.

16. The method for suppressing the change of wireless power of claim 15, wherein in response to determining that the second verification result of the power adjustment stopping step is the second power difference smaller than or equal to the power adjustment stop difference, a stopping step is performed, and the first power detecting step is performed after the stopping step is performed.

17. A device for suppressing a change of wireless power, comprising:
 a memory storing a power parameter set, wherein the power parameter set comprises a power adjustment start difference, a power adjustment stop difference, a target output power and an adjustment parameter set;
 a power amplifying unit generating an output power;
 a power detector electrically connected to the power amplifying unit, wherein the power detector detects the output power of the power amplifying unit to obtain a first output power and a second output power; and
 a processing unit electrically connected to the memory, the power amplifying unit and the power detector, wherein the processing unit verifies whether a first power difference between the first output power of the power amplifying unit and the target output power is greater than the power adjustment start difference to generate a first verification result, the processing unit verifies whether a second power difference between a second output power and the target output power is smaller than or equal to the power adjustment stop difference to generate a second verification result, and the processing unit determines whether the power amplifying unit is adjusted according to at least one of the first verification result and the second verification result;
 wherein the processing unit adjusts the power amplifying unit according to the adjustment parameter set.

18. The device for suppressing the change of wireless power of claim 17, further comprising:
 a coupler electrically connected between the power amplifying unit and the power detector, wherein the coupler is configured to couple the output power of the power amplifying unit to the power detector.

19. The device for suppressing the change of wireless power of claim 17, wherein the adjustment parameter set comprises any two of a power adjusting amplitude, a power adjusting time-varying value and a power adjusting period value, the power adjusting amplitude represents a change of the output value of a power adjusting step, the power adjusting time-varying value represents a change of the output power in an unit time period, and the power adjusting period value represents an executing time of the power adjusting step.

20. The device for suppressing the change of wireless power of claim 19, wherein,
 the power adjustment start difference is greater than the power adjustment stop difference;
 the power adjusting amplitude is smaller than or equal to a predetermined amplitude, and the predetermined amplitude is between 0.01 dB and 0.1 dB during the power adjusting step;
 the power adjusting time-varying value is smaller than or equal to a predetermined time-varying value, and the predetermined time-varying value is between 0.01 dB/sec and 0.2 dB/sec; and
 the power adjusting period value is equal to the power adjusting amplitude divided by the power adjusting time-varying value.

\* \* \* \* \*